June 15, 1943.  A. J. HIGGINS  2,321,677
AMPHIBIAN BRIDGE
Filed Feb. 24, 1942  2 Sheets-Sheet 1
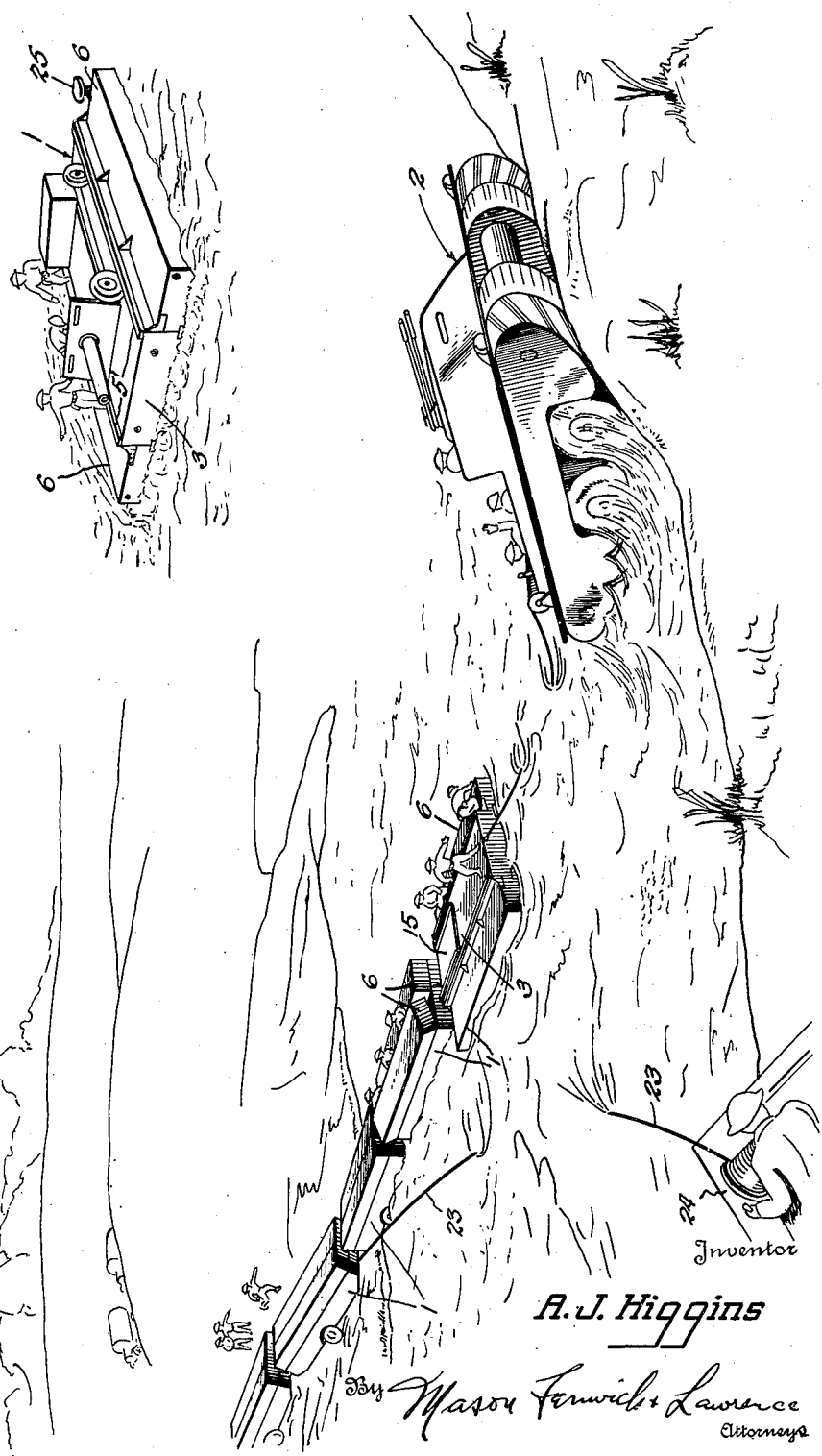
Inventor
A. J. Higgins
By Mason Fenwick & Lawrence
Attorneys June 15, 1943.  A. J. HIGGINS  2,321,677
AMPHIBIAN BRIDGE
Filed Feb. 24, 1942  2 Sheets-Sheet 2
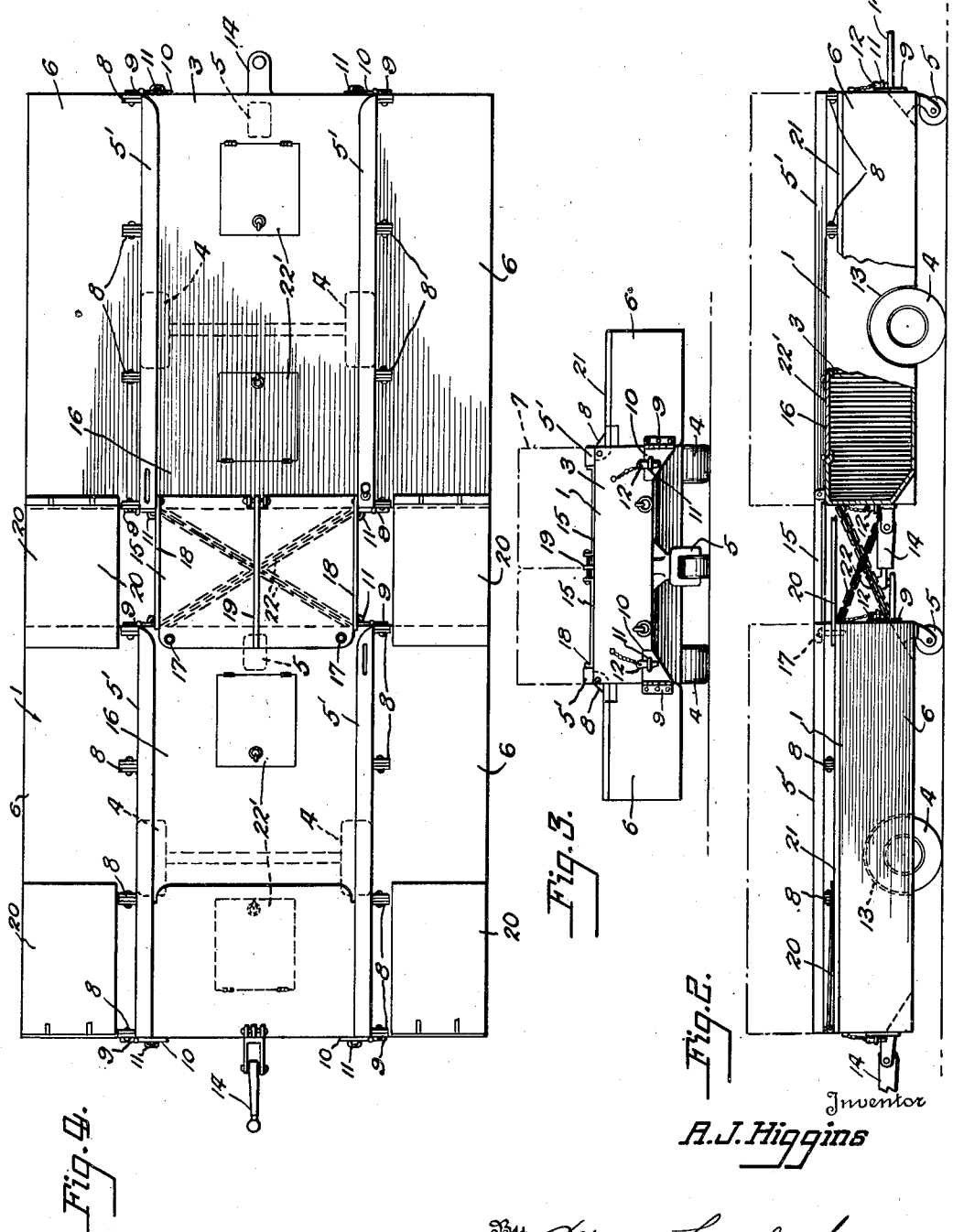

Patented June 15, 1943

2,321,677

UNITED STATES PATENT OFFICE 2,321,677

AMPHIBIAN BRIDGE

Andrew Jackson Higgins, New Orleans, La.

Application February 24, 1942, Serial No. 432,138

11 Claims. (Cl. 14—27)

This invention relates to an amphibian bridge, particularly useful for military purposes.

The general object of the invention is to provide a bridge having the form of a train of serially connected amphibian wheeled units adapted to be hauled along highways as trailers, by a suitable automotive unit, and to be towed across a stream in the form of a connected train by an amphibian tank, the leading and trailing ends being secured to the respective banks of the stream, the amphibian units serving as pontoons, affording passage of troops and equipment across the stream.

The invention contemplates the bridge as a whole including the amphibian automotive unit, also the trailer units per se, which have individual utilities as well as a cooperative function as part of the bridge.

A more specific object of the invention is to provide a trailer pontoon bridge comprising a train of serially connected wheeled pontoons drawn by a cable between the head of the train and secured to a power driven winch on the amphibian tank, so that the latter can first cross the stream paying out the cable from the winch, and having reached a secure footing on the far bank, the amphibian tank may stop and draw the tow across by means of the winch.

Another object of the invention is to provide a vehicular pontoon including a middle portion or barge having a width of eight feet, for example, so that it does not exceed the width of one traffic lane of a highway, and having side sections laterally hinged to the middle pontoon and both having an aggregate width not exceeding the width of the middle portion, so that on land the side sections can be folded on top of the middle portion without exceeding its width dimension, while in the water the side sections may be let down and secured, serving as stabilizing outriggers, and also increasing the width of the bridge, the roadway formed by the middle portions being for the passage of vehicular equipment, while the lateral pathways formed by the side sections being adapted for pedestrian or infantry traffic.

Other objects of the invention will appear as the following description of a preferred and practical embodiment thereof proceeds.

In the drawings which accompany and form a part of the following specification, and throughout the several figures of which the same characters of reference have been employed to designate identical parts:

Figure 1 is a perspective view illustrating an amphibian bridge embodying the principles of the subject invention, in process of crossing a river;

Figure 2 is a side elevation of two of the amphibian pontoon units;

Figure 3 is an end view of one of the amphibian pontoon units, the side sections being extended, the broken lines indicating the overfolded position of the side sections;

Figure 4 is a plan view of the adjacent units shown in Figure 2;

Figure 5 is a perspective view showing a single pontoon unit used as a raft.

Referring now in detail to the several figures, it will be observed that the amphibian bridge comprises a series of serially connected trailer units, each of which is designated as a whole by the reference character 1, drawn by an automotive unit which in general is designated by the reference character 2.

Each of the trailer units comprises a middle closed hollow barge 3, the width of which preferably does not exceed that of a single traffic lane of a highway, so that the train of amphibian pontoon units can be hauled along a highway without interfering with oppositely moving traffic. Its middle portions or barges 3 are supported by the vehicle wheels 4 and when standing alone, also by the caster wheel 5 at one end. The barges 3 are preferably provided with longitudinal side rails 5' at the top.

Side sections 6 are provided, these being each in the form of a closed hollow body preferably the same length and substantially the same depth as the middle portion or barge 3. Normally, when the train of amphibian pontoons is traveling along the highway and also at times, when it is serving its purpose as a pontoon bridge, the side sections 6 occupy a position in which they overlie the middle portion 3, as indicated by the broken line 7 in Figure 3. The side sections 6 are preferably of such width that the combined width of both does not exceed that of the middle portion 3, so that when they are in overlying position they are still within the width dimension of the middle portion.

Usually, when the amphibian pontoon train is functioning as a bridge the side sections 6 will be extended, as shown in Figure 3, not only acting as outriggers to stabilize the bridge, but increasing its width so that the middle portion can be devoted to the passage of vehicular equipment, while the lateral portions may be utilized by pedestrian traffic. In order to permit the side sections 6 to alternatively fold over on top of the barge 3, or stand extended at the sides of said barge, they are hingedly connected at their inner upper longitudinal edges to the outer upper longitudinal edges of the barge 3 by connections of any suitable type, the illustrated connections comprising several pairs of hinges 8, arranged along the contiguous longitudinal edges of the barge 3 and side sections 6.

The side sections 6 are secured against swinging by means of the hasp connections 9, which as shown, comprise the swinging members 10 secured to the ends of the side sections and which are apertured to pass over staples 11 secured to the barge 3, wedge pins 12 being employed to secure the hasp connections in locked position.

It will be obvious to those skilled in the art that the vehicle wheels 4 will be set in suitable recesses 13 in the sides of the barge 3, so as to permit the side sections 6 to lie in flat engagement with the sides of the barge.

It will be observed in Figure 2 that the amphibian pontoons constituting the train are connected, whether on land or in the water, by a tracking hitch 14 of such character as to keep the pontoons a fixed distance apart. A platform 15 is provided for the middle portion of each of the pontoon units, being hingedly secured at one end of the floor 16 of said unit, and being of such length as to bridge the distance between the adjacent units and to rest upon the floor of the adjacent unit, being detachably secured by suitable means such as the headed pin 17 which fits into a recess on the lower side of the platform. The width of the platform is preferably such as to let it seat between the side rails 5. For the sake of stiffness, the platform 15 is preferably provided with the upstanding lateral flanges 18 and an upstanding rib 19 in the middle. The flange 18 and rib 19 are so positioned as not to interfere with the passage of vehicular traffic.

Each of the side sections 6 is provided with a platform 20 hingedly secured to one end of the floor 21 of the side section of sufficient length to bridge the space between adjacent side sections, and to lap on the floor of the adjacent side section.

The floors 16 of all the pontoon units, together with the bridging platforms 15, form a continuous roadway for the passage of vehicular traffic while the floors 21 of all the side sections together with the bridging platform 20 constitute continuous lateral pathways for pedestrains or infantry traffic. When the side sections are to be folded up on top of the middle portion, the platforms are first folded back upon the respective middle portion and side sections to which they are hinged.

When the train of connected amphibian pontoons is used as a bridge, the provision of means is required to prevent angular movement between the ends of adjacent barges in a horizontal direction and also relative up and down movement between the adjacent ends of said barges. The means shown comprises a pair of chains, respectively connected to the opposite top corners of the ends of adjacent barges and extending diagonally downward to the opposite bottom corners. These act as diagonal bracing and the barges cannot deviate relatively in a lateral direction, due to the tension put upon one or the other of these chains. When a piece of heavy equipment is passing from one barge to the other and its weight is at the end of one barge, the tendency of that end to settle deeper into the water is overcome by the fact that one or the other of the chains attached to the adjacent barge holds it up through the buoyancy of the adjacent barge.

Either the middle portion 3 or the side sections 6 may be provided with hatches, giving access to the interior for purpose of storage. As herein shown, the middle barges 3 are provided with the hatches 22' which are so placed as to be out of the path of the wheels of the passing vehicular equipment.

In operating the amphibian bridge, a sufficient number of the wheeled pontoon trailer units are made up into a train at a place remote from the stream to be bridged, and hauled along the highway by any suitable automotive unit such as a truck or tank which may or may not be of the amphibian type. While being towed along the highway, the side sections are in a position overlying the middle portion 3, as shown in Figure 3, so that the overall width of the train is not greater than the width of a single traffic lane. When the stream is reached, an amphibian tank is coupled to the head of the train, the tank being preferably of the type having a power winch and connected to the train by a cable which is windable upon the winch. In order to minimize the load on the amphibian tank, it preferably crosses the stream paying out the cable from the winch, and after it has reached the far bank of the stream and is on a secure footing, the winch is operated to wind in the cable and draw the train of pontoons across the stream. As the pontoons enter the water, the engineers tip the side sections over, as shown in connection with the second pontoon in Figure 1. When the side sections are awash, the engineers rock the pontoon laterally so as to lift the side section on one side above the supporting water, causing it to bear close against the adjacent side of the middle portion. A man then slips the hinge of the hasp 10 over the staple 11 and inserts the wedge pin 12. In the alternate lateral rocking movements of the pontoon boat, side sections may be thus secured in a minimum space of time. The chains 22 are then connected in position to prevent angular deviation of the adjacent ends of adjacent pontoons and to prevent substantial relative up and down movements of adjacent ends of adjacent pontoons under the shift of weight which will occur when heavy equipment passes from one to the other over the platforms 15. The platforms are then placed in bridging relation to the spaces between the pontoons, thus completing the middle vehicular and the lateral pedestrian highways across the bridge. By the time the first pontoon of the train has been hauled ashore, the bridge is complete.

Figure 1 shows at 23 a stern line from the power driven winch of an amphibian tank 24 to prevent the intermediate or posterior portion of the bridge from being carried down stream with the current.

It will be understood to those skilled in the art that the pontoon bridge of the subject invention can be laid across a river in a much shorter period of time and with much less risk to the personnel engaged in its operation, than with the ordinary pontoon bridge which is built piecemeal across the stream from the near bank.

Figure 5 illustrates an auxiliary use of a single pontoon unit as a raft for ferrying over pieces of mechanized equipment, or troops. In the example shown, the raft is powered by an outboard motor 25.

While I have in the above description disclosed what I believe to be a preferred and practical embodiment of the invention, it will be understood to those skilled in the art that the specific details of construction and arrangement of parts as shown and described, are by way of illustration and not to be construed as limiting the scope of the invention which is defined in the appended claims.

What I claim as my invention is:

1. Amphibian bridge comprising a train of wheeled pontoons serially connected end to end and an amphibian automotive unit having a power driven winch, a cable on said winch connected to the head of said train whereby said automotive unit can travel close coupled to said train or move away therefrom while still connected to said train.

2. Amphibian bridge comprising a train of wheeled pontoons serially connected, each comprising a hollow closed middle portion and hollow closed side sections, said portion and said sections being each of substantially parallelepipedal form, the side sections normally overlying the middle portion congruently, hinge connections between the outer longitudinal edges of the middle portion and the adjacent edges of the side sections whereby said side sections may swing to extended lateral positions with respect to said middle portion with their then adjacent sides in abutment, means for securing said side sections in said lateral positions rigidly with respect to said middle portions, platforms one for each middle portion hingedly secured at one end to the upper face thereof adapted to lap onto the upper face of the adjacent pontoon, constituting the middle portions of the train of pontoons a continuous roadway, platforms one for each of said side sections, hingedly secured at one end to the upper face thereof adapted to lap onto the upper face of the adjacent section, constituting the side sections of the train of pontoons continuous pathways laterally of the roadway formed by the middle portion.

3. Amphibian bridge comprising a train of wheeled pontoons serially connected, each comprising a hollow closed middle portion and hollow closed side sections, said portion and said sections being each of substantially parallelepipedal form, the side sections normally overlying the middle portion in a congruent manner, hinge connections between the outer longitudinal edges of the middle portion and the adjacent edges of the side sections whereby said side sections may swing to extended lateral positions with respect to said middle portion with their then adjacent sides in abutment, and means for securing said side sections in said lateral positions rigidly with respect to said middle portion.

4. Amphibian bridge as claimed in claim 3, including wheels adapted to support said pontoon on land, secured to said middle portion in recesses in the longitudinal sides thereof, and located wholly inwardly of the interfaces between the middle portion and the adjacent sides of the extended side sections.

5. Amphibian bridge comprising a train of wheeled pontoons serially connected, each comprising a hollow closed middle portion and hollow closed side sections, said portion and said sections being each of substantially parallelepipedal form, the side sections normally overlying the middle portion congruently, hinge connections between the outer longitudinal edges of the middle portion and the adjacent edges of the side sections whereby said side sections may swing to extended lateral positions with respect to said middle portion with their adjacent sides in abutment, and means for securing said side sections in said extended lateral positions comprising a hasp and staple connection at each end of said side sections and middle portion crossing the planes of the interfaces between the contiguous sides of said middle portion and extended side sections at points remote from the axes of the hinge connections, including a pin through said staple for locking said connections.

6. Amphibian bridge as claimed in claim 5, including wheels adapted to support said pontoon on land, secured to said middle portion in recesses in the longitudinal sides thereof and located wholly inwardly of the interfaces between the middle portion and extended side sections.

7. Amphibian bridge as claimed in claim 5, including platforms one for each middle portion hingedly secured at one end to the upper face thereof adapted to lap onto the upper face of the adjacent pontoon, constituting the middle portions of the train of pontoons a continuous roadway, platforms one for each of said side sections hingedly secured at one end to the upper face thereof adapted to lap onto the upper faces of the corresponding sections of adjacent pontoons, constituting the side sections of the train of pontoons continuous pathways laterally of the roadway formed by the middle portion.

8. Unit pontoon for an amphibian bridge comprising a hollow closed middle portion and hollow closed side sections, said portion and said sections being each of substantially parallelepipedal form, the side sections normally overlying the middle portion in a congruent manner, hinge connections between the outer longitudinal edges of the middle portion and the adjacent edges of the side sections whereby said side sections may swing to extended lateral positions with respect to said middle portion with their then adjacent sides in abutment, and means for securing said side sections in said lateral positions rigidly with respect to said middle portion.

9. Unit pontoon for an amphibian bridge as claimed in claim 8, including wheels adapted to support said pontoon on land, secured to said middle portion in recesses in the longitudinal sides thereof and located wholly inwardly of the interfaces between the middle portion and extended side sections.

10. Unit pontoon for amphibian bridge as claimed in claim 8, including a platform hingedly secured at one end to the upper face of the middle portion adapted to lap onto the upper face of the middle portion of an adjacent pontoon to form a continuous roadway, and platforms one for each of said side sections hingedly secured at one end to the upper faces thereof adapted to lap onto the upper faces of the corresponding sections of an adjacent pontoon to form continuous pathways laterally of the middle roadway.

11. Unit pontoon for amphibian bridges as claimed in claim 8, the securing means comprising hasp and staple connections at the ends of said middle portion and side sections crossing the interfaces between the contiguous sides of said middle portion and side sections at points remote from the hinge axes, including a pin through said staple for locking said connections.

ANDREW JACKSON HIGGINS.